(12) United States Patent
Yang et al.

(10) Patent No.: US 7,637,782 B1
(45) Date of Patent: Dec. 29, 2009

(54) CARD CONNECTOR

(75) Inventors: Chih-Ling Yang, Taipei Hsien (TW);
Hsin-Tsung Ho, Taipei Hsien (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 12/337,251

(22) Filed: Dec. 17, 2008

(51) Int. Cl.
*H01R 24/00* (2006.01)
(52) U.S. Cl. ...................................... 439/626; 439/159
(58) Field of Classification Search .................. 439/626, 439/630, 363, 570, 62, 157, 325–329, 152–160; 361/801–802, 740, 748, 756, 759, 747, 737
See application file for complete search history.

(56) References Cited

U.S. PATENT DOCUMENTS 7,056,153 B2 * 6/2006 Watanabe et al. ........... 439/630
7,128,613 B1 * 10/2006 Lee et al. .................... 439/630
2007/0287311 A1 * 12/2007 Ma ............................ 439/159

* cited by examiner

*Primary Examiner*—Edwin A. Leon
(74) *Attorney, Agent, or Firm*—WPAT, P.C.; Anthony King

(57) ABSTRACT

A card connector adapted for receiving a card has an insulating housing having a plurality of first terminal recesses. Each of the first terminal recesses includes a fixing recess extending frontward and rearward. The fixing recess has a substantially middle portion extending towards a side to form a sliding recess. The sliding recess has a rear portion extended rearward at a lower portion thereof to form a stopping recess and a stopping portion over the stopping recess. A plurality of first connecting terminals are received in the corresponding first terminal recesses. The first connecting terminal has a first fixing portion. A substantially middle portion of one side of the first fixing portion is extended sideward to form an engaging portion inserted into the stopping recess from the sliding recess for being stopped by the stopping portion.

4 Claims, 4 Drawing Sheets

CARD CONNECTOR

BACKGROUND OF THE INVENTION

1. Field of the Invention

The present invention relates to a card connector, and more particularly to a card connector including a plurality of connecting terminals for electrically connecting with an inserted card.

2. The Related Art

In recent years, with the widely spreading applications of electronic devices, such as mobile phones, digital cameras and the like, a variety of cards, having a large memory capacity and compact shape, have been used widely. In general, a conventional card connector mounted in the electronic device has a plurality of connecting terminals for electrically connecting with the card. So it is important to make the connecting terminals connect with the card steadily. However, since the shape of the card connector depends on the left space of the electronic device, the connecting terminals received in the card connector may be designed to have a longer length. Thus when the card is inserted into the card connector, a squeezing pressure may be generated between the card and the connecting terminals so as to make a middle portion of the connecting terminals curve, which will have influence on the steady connection state between the card and the connecting terminals.

SUMMARY OF THE INVENTION

Accordingly, an object of the present invention is to provide a card connector having a structure for fixing a connecting terminal to prevent deformation.

A card connector adapted for receiving a card has an insulating housing having a plurality of first terminal recesses. Each of the first terminal recesses includes a fixing recess extending frontward and rearward. The fixing recess has a substantially middle portion extending towards a side to form a sliding recess. The sliding recess has a rear portion extended rearward at a lower portion thereof to form a stopping recess and a stopping portion over the stopping recess. A plurality of first connecting terminals are received in the corresponding first terminal recesses. The first connecting terminal has a first fixing portion. A substantially middle portion of one side of the first fixing portion is extended sideward to form an engaging portion inserted into the stopping recess from the sliding recess for being stopped by the stopping portion.

As described above, the fixing recess of the first terminal recess has a substantially middle portion extending towards a side to form the sliding recess, the rear portion of the sliding recess is extended rearward at a lower portion thereof to form the stopping recess and the stopping portion over the stopping recess. The engaging portion is disposed at a middle portion of one side of the first fixing portion of the first connecting terminal. When the card is inserted into the card connector, the engaging portion inserts into the stopping recess from the sliding recess and stopped by the stopping portion, which will prevent deformation of the first fixing portion so as to guarantee the steady connection of the first connecting terminals and the card.

BRIEF DESCRIPTION OF THE DRAWINGS

The present invention will be apparent to those skilled in the art by reading the following description of an embodiment thereof, with reference to the attached drawings, in which.

DETAILED DESCRIPTION OF THE PREFERRED EMBODIMENT

Figure 1:
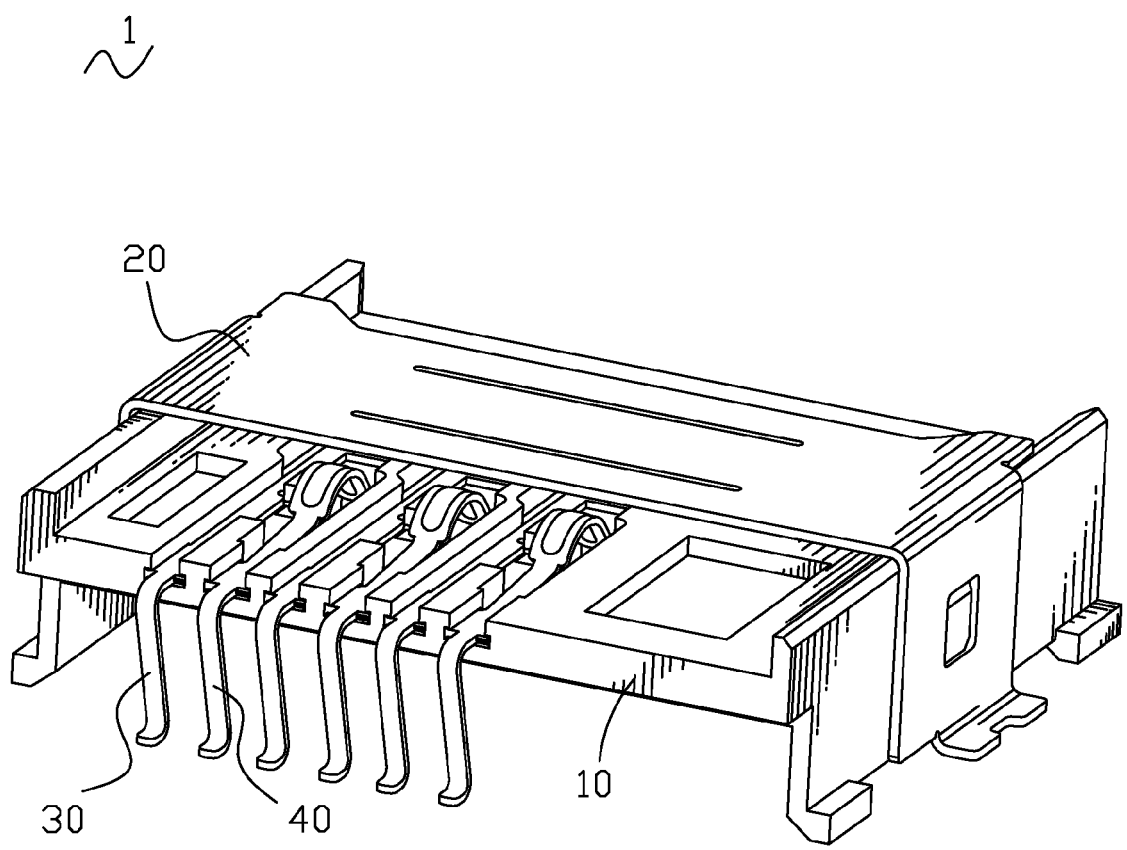
FIG. 1 is an assembled view of a card connector in an embodiment according to the present invention.
Figure 2:
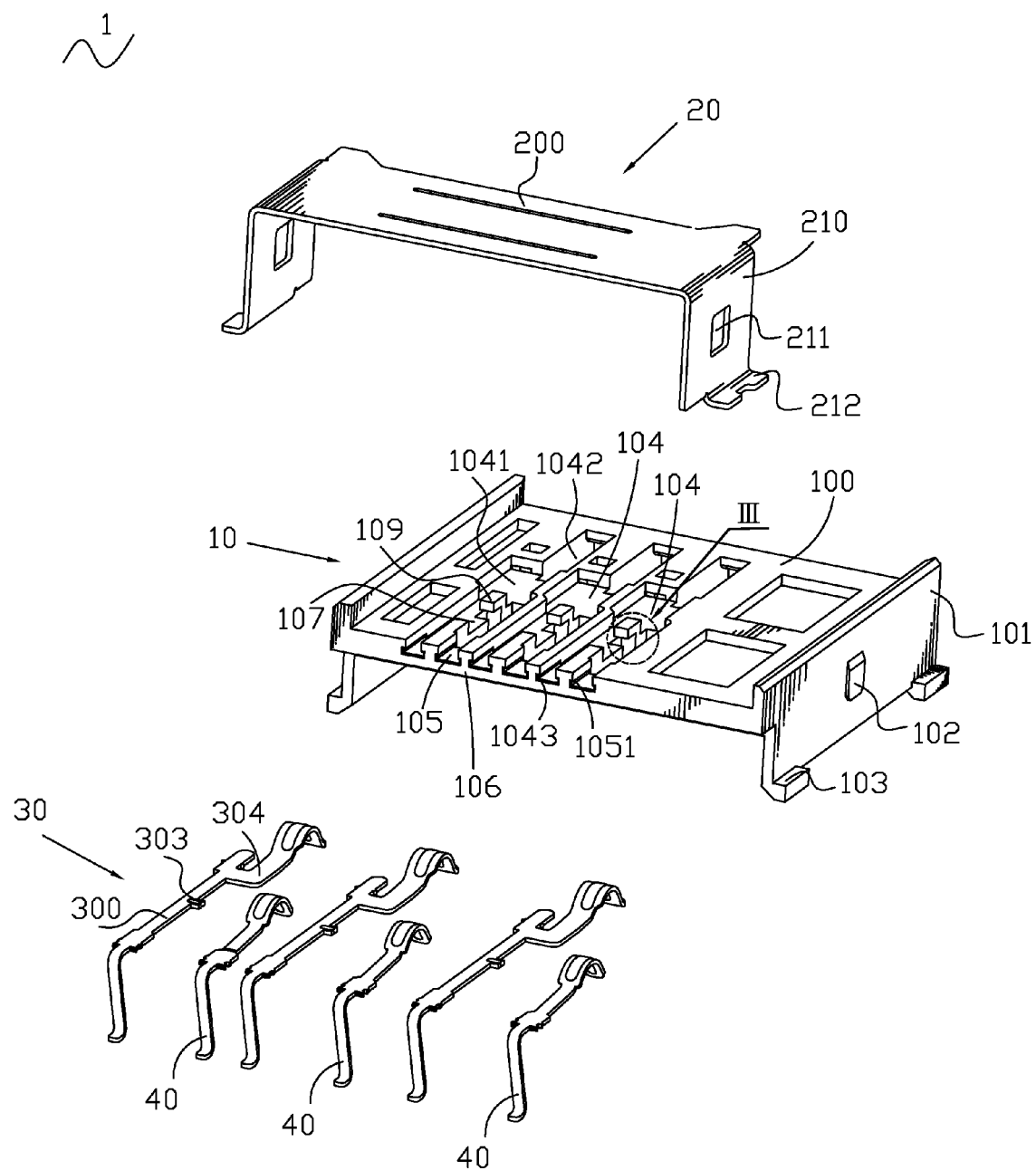
FIG. 2 is an exploded view of the card connector shown in FIG. 1.

With reference to FIG. 1 and FIG. 2, an embodiment of a card connector 1 according to the present invention is shown. The card connector 1 includes an insulating housing 10, a metal shell 20, a plurality of connecting terminals including a plurality of first connecting terminals 30 and second connecting terminals 40.

Figure 3:
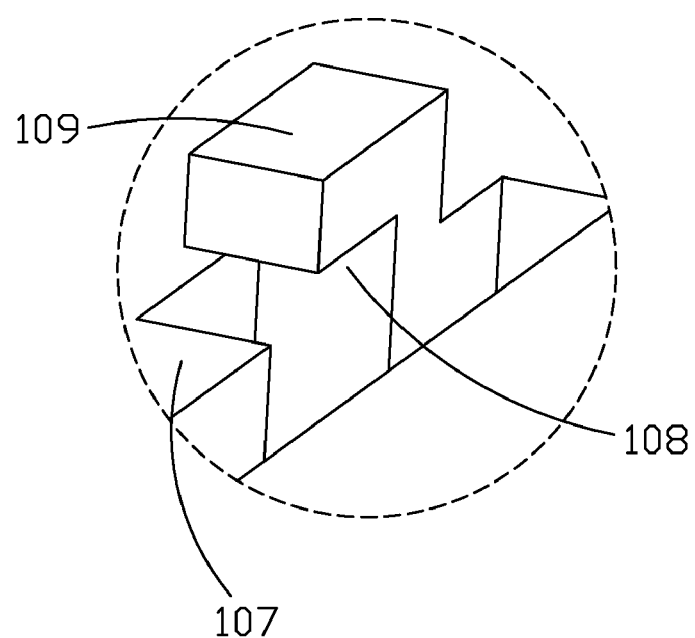
FIG. 3 is a partly enlarged view showing an enlarged III portion of FIG. 2.

Please refer to FIG. 2 and FIG. 3, the insulating housing 10 has a substantially rectangular basic body 100, a pair of sidewalls 101 extending upwards and downwards from two opposite sides of the basic body 100. Each of the sidewalls 101 protrudes outwards from an outer surface thereof to form a bump 102. Two installing portions 103 are extended perpendicularly from two ends of a bottom edge of the sidewall 101. The basic body 100 has a plurality of terminal recess units at a top thereof and defines a front surface 106. Each of the terminal recess units has a first terminal recess 104 which includes a fixing recess 1041 extending frontward and backwards and a connecting recess 1042 extending sideward from a rear portion thereof and then extending rearward to show a substantially L-shape, and a second terminal recess 105 extending frontward and backwards. The second terminal recess 105 is disposed in alignment with a branch of the connecting recess 1042 and reaches the front surface 106. Two opposite bottom sides of the second terminal recess 105 extend oppositely to form a pair of second buckling recesses 1051 passing through the front surface 106. Two opposite bottom sides of the fixing recess 1041 extend oppositely to form a pair of first buckling recesses 1043. The fixing recess 1041 has a substantially middle portion extending towards a side to form a sliding recess 107. The sliding recess 107 has a rear portion extended rearward at a lower portion thereof to form a stopping recess 108 and a stopping portion 109 over the stopping recess 108. In this embodiment, the sliding recess 107 and the stopping recess 108 are adjacent to the corresponding second terminal recess 105.

Figure 4:
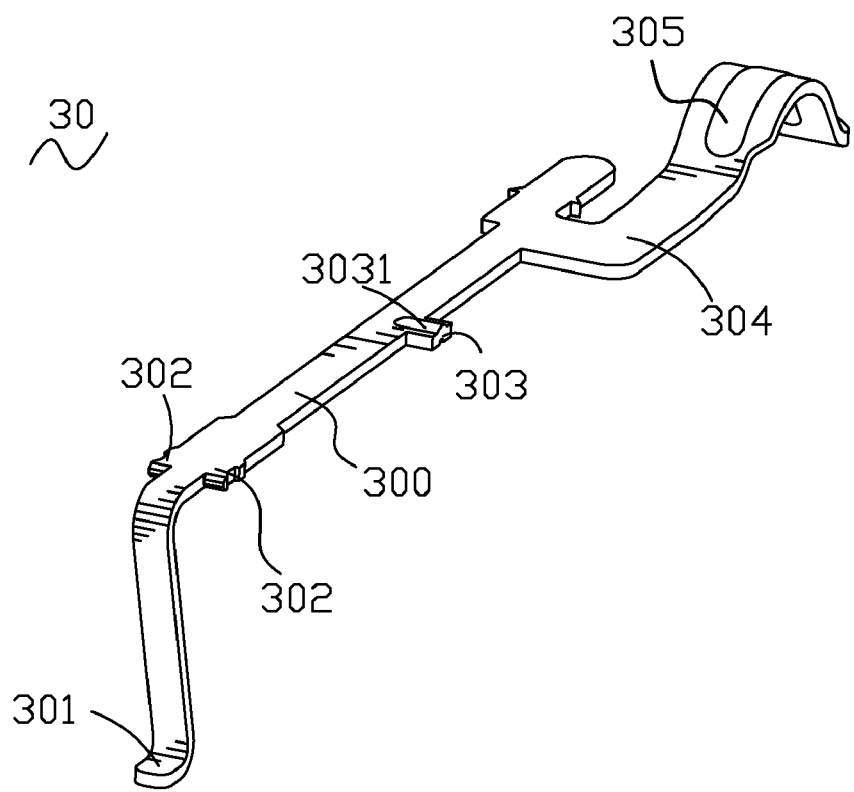
FIG. 4 is a perspective view of a first connecting terminal of the card connector shown in FIG. 2.

With reference to FIG. 2 and FIG. 4, the first connecting terminal 30 has a first fixing portion 300 which is substantially of strip shape and received in the fixing recess 1041. A front end of the first fixing portion 300 is extended downwards to form a first soldering portion 301 for being soldered on a printed circuit board (PCB, not shown). Front portions of two sides of the first fixing portion 300 protrude oppositely and respectively to form a first buckling portion 302 restrained by the corresponding first buckling recess 1043 for fixing the first connecting terminal 30 to the insulating housing 10. A middle portion of one side of the first fixing portion 300 is extended sideward to form an engaging portion 303 corresponding to the stopping recess 108. The engaging portion 303 has a protrusion 3031 at a top thereof. A rear portion of the side of the first fixing portion 300, with the engaging portion 303 located thereon, has a connecting portion 304 away from the first buckling portion 302 and extending substantially perpendicular to the first fixing portion 300 and then bending back to the first buckling portion 302 to show a substantially L shape. A distal end of the connecting portion 304 is curved upwards to form a first contacting portion 305 of arc shape.

Figure 5:
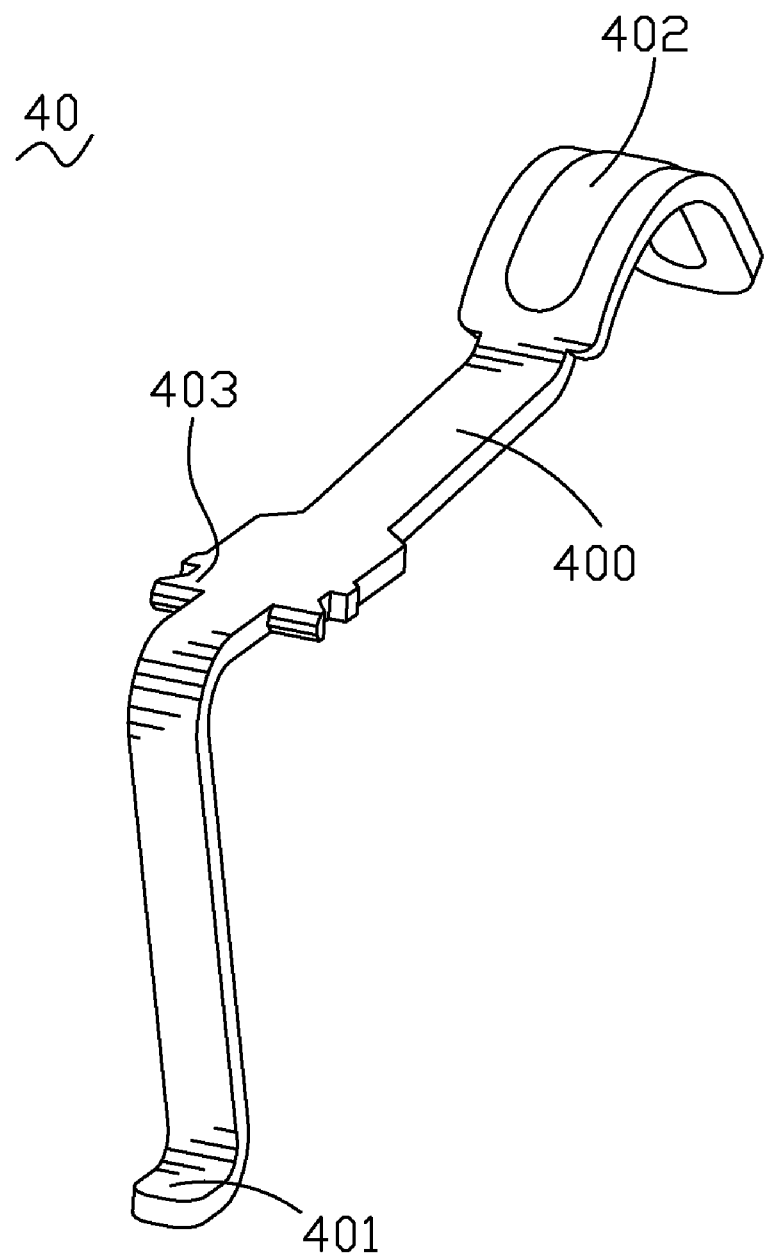
FIG. 5 is a perspective view of a second connecting terminal of the card connector shown in FIG. 2.

With reference to FIG. 2 and FIG. 5, the second connecting terminal 40 has a second fixing portion 400 of substantially strip shape and shorter than the first fixing portion 300. A front end of the second fixing portion 400 is extended downwards to form a second soldering portion 401 which is narrower than the second fixing portion 400 and soldered on the PCB, while a rear end of the second fixing portion 400 is extended obliquely and upwards, and then curved downwardly to form a second contacting portion 402 similar to the first contacting portion 305 for electrically connecting with an inserted card (not shown). Front portions of two sides of the second fixing portion 400 protrude respectively and oppositely to form a second buckling portion 403 adjacent to the second soldering portion 401, respectively, for engaging with the second buckling recess 1051.

Please refer to FIGS. 1-2, the metal shell 20 coupled with the insulating housing 10 defines a first covering plate 200 and two lateral plates 210 which extend downwards from two opposite sides of the covering plate 200 and flank two opposite sides of the insulating housing 10. The lateral plate 210 has a mating portion 211 corresponding to the bump 102 for fixing the metal shell 20 and the insulating housing 10. A bottom edge of the lateral plate 210 is bent outwards to form a soldering piece 212 for fixing the card connector 1.

Please refer to FIGS. 1-3 and FIG. 5, in assembly, the first fixing portion 300 of the first connecting terminal 30 is placed in the fixing recess 1041. The first buckling portions 302 are respectively received in the corresponding first buckling recesses 1043 for fixing the first connecting terminal 30. The engaging portion 303 is inserted into the stopping recess 108 with the protrusion 3031 against the stopping portion 109. The connecting portion 304 is located in the connecting recess 1042, with the first contacting portion 305 disposed above a bottom of the basic body 100 for electrically connecting with the inserted card. The second connecting terminal 40 is received in the second terminal recess 105, with the second buckling portions 403 restrained in the corresponding second buckling recesses 1051. The second contacting portion 402 is also projected out of the bottom of the basic body 100, like the first contacting portion 305. The metal shell 20 is coupled with the insulating housing 10 to form a receiving chamber for receiving the inserted card.

As described above, when the card is inserted into the card connector 1, the first and second contacting portions 305, 402 are all pressed downwards, which makes a middle portion of the first fixing portion 300 tend to curve upwards because the first fixing portion 300 is longer and narrower. But the engaging portion 303 is inserted into the stopping recess 108 with the protrusion 3031 against the stopping portion 109, which will prevent deformation of the first fixing portion 300 so as to guarantee the steady connection of the first connecting terminals 30 and the card.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A card connector adapted for receiving a card, comprising:
    an insulating housing having a plurality of first terminal recesses, each of the first terminal recesses including a fixing recess extending frontward and rearward, the fixing recess having a substantially middle portion extending towards a side to form a sliding recess, the sliding recess having a rear portion extended rearward at a lower portion thereof to form a stopping recess and a stopping portion over the stopping recess; and
    a plurality of first connecting terminals received in the corresponding first terminal recesses, the first connecting terminal having a first fixing portion, a substantially middle portion of one side of the first fixing portion extended sideward to form an engaging portion inserted into the stopping recess from the sliding recess for being stopped by the stopping portion,
    wherein the first connecting terminal further comprises a first contacting portion for elastically contacting the card and a first soldering portion at two opposite ends thereof, respectively,
    wherein the first terminal recess further comprises a connecting recess extending sideward from a rear portion of the first fixing recess and then extending rearward to show a substantially L-shape, the first connecting terminal includes a connecting portion extending substantially perpendicularly from a rear portion of the first fixing portion and then bending rearward to show a substantially L shape, a distal end of the connecting portion is curved upwards to form the first contacting portion.

2. The card connector as claimed in claim 1, wherein the engaging portion has a protrusion at a top thereof for abutting against the stopping portion fixedly.

3. The card connector as claimed in claim 1, further comprising second connecting terminals, each of the second connecting terminals including a second fixing portion, a second soldering portion and a second contacting portion extended from two opposite ends of the second fixing portion, the insulating housing further defining second terminal recesses corresponding to the first terminal recesses for receiving the second connecting terminals, the second terminal recess being disposed in alignment with and in front of a branch of the connecting recess.

4. The card connector as claimed in claim 3, wherein the sliding recess and the stopping recess are adjacent to the corresponding second terminal recess.

* * * * *